United States Patent [19]

Coker

[11] Patent Number: 4,858,517
[45] Date of Patent: Aug. 22, 1989

[54] FIRE DAMPER KIT

[76] Inventor: Rick Coker, 326 Clara Ln., Belen, N. Mex. 87002

[21] Appl. No.: 204,007

[22] Filed: Jun. 8, 1988

[51] Int. Cl.$^4$ .......................... F24F 11/02; F16K 17/40
[52] U.S. Cl. ................................................. 98/1; 49/7; 126/287.5; 137/74; 137/75; 137/315; 251/305
[58] Field of Search .................... 49/7; 98/1, 40.06; 137/72, 74, 75, 315; 126/285 R, 287.5; 251/304, 305

[56] References Cited

U.S. PATENT DOCUMENTS

| | | | |
|---|---|---|---|
| 289,274 | 11/1883 | Kopp | 137/75 |
| 1,618,551 | 2/1927 | Perry et al. | 49/7 |
| 2,148,530 | 2/1939 | Burke | 98/1 |
| 2,270,073 | 1/1942 | Merry | 98/1 |
| 3,076,469 | 2/1963 | Averill | 137/74 |
| 3,165,050 | 1/1965 | Johnson | 137/75 |
| 3,172,347 | 3/1965 | Johnson | 98/1 |
| 3,283,691 | 11/1966 | Reiter | 137/74 |
| 3,720,153 | 3/1973 | Jardinier | 98/1 |
| 4,207,864 | 6/1980 | Fischer | 126/285 R |
| 4,235,256 | 11/1980 | Crawshay | 137/240 |
| 4,413,613 | 11/1983 | Dunlap | 126/292 |
| 4,476,852 | 10/1984 | Lee | 126/289 |
| 4,691,689 | 9/1987 | Shepherd | 126/295 |

FOREIGN PATENT DOCUMENTS

| | | | |
|---|---|---|---|
| 2307228 | 11/1976 | Fed. Rep. of Germany | 137/75 |
| 2140805 | 1/1973 | France | 137/75 |

Primary Examiner—George L. Walton
Attorney, Agent, or Firm—Leon Gilden

[57] ABSTRACT

A fire damper kit is set forth wherein a fire damper box is formed with a first framing angle iron fixedly secured thereto with a second angle iron slidable thereon to secure said damper and sandwich a fire wall between said opposed angle iron collars. A fusable link positions a fire damper door in a first position to enable heat flow through associated duct work wherein a chimney fire will effect a release of said door to prevent spread of a fire through the duct work.

1 Claim, 1 Drawing Sheet

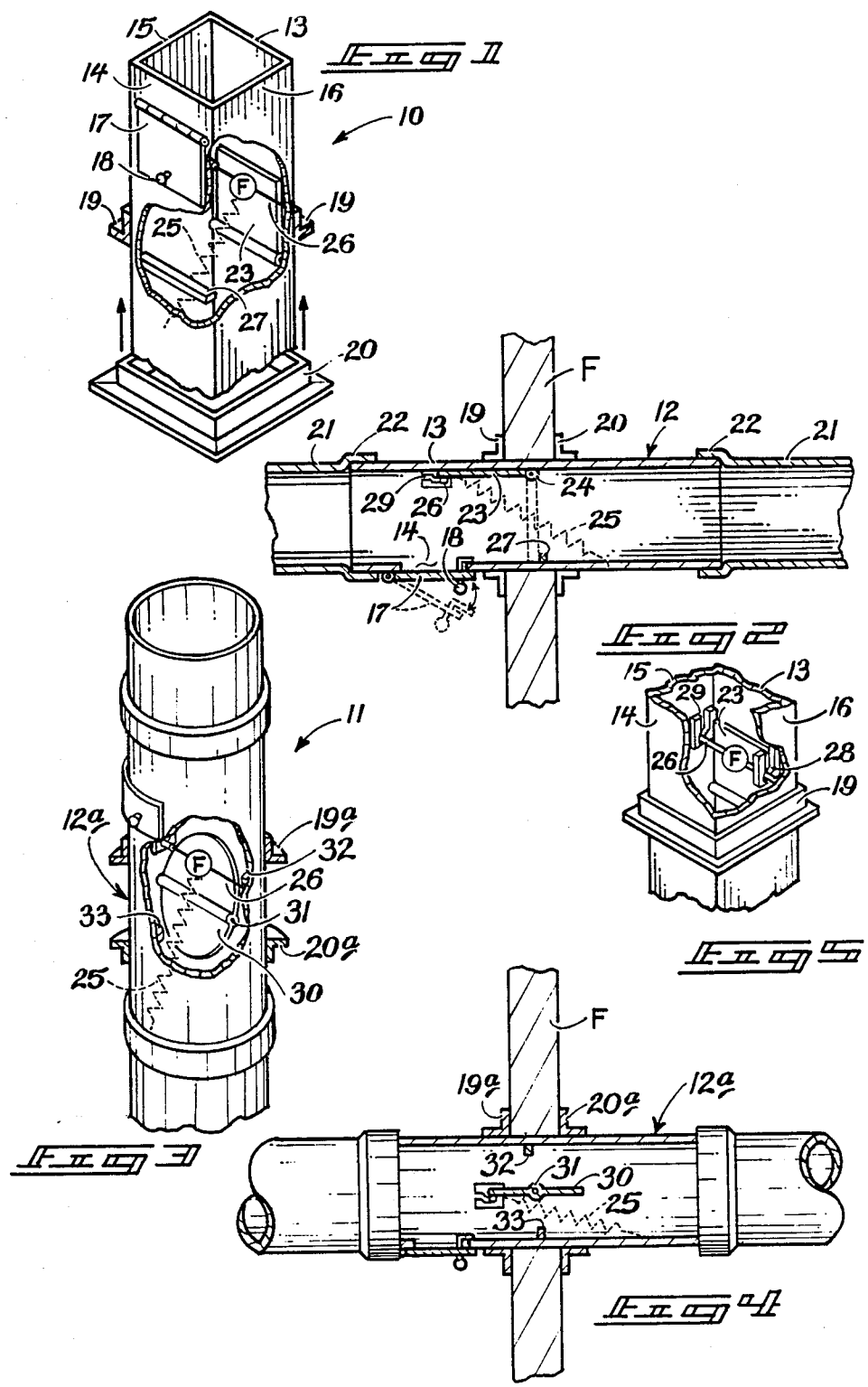

FIRE DAMPER KIT

BACKGROUND OF THE INVENTION

1. Field of the Invention

The field of invention relates to flue dampers, and more particularly pertains to a new and improved fire damper kit that is easily installed and upon sensing of a flue fire will close a damper door to prevent spread of the fire throughout associated duct work.

2. Description of the Prior Art

The use of flue dampers is well known in the prior art. As can be appreciated, these devices usually require a substantial amount of effort and complexity in securing and maintaining within them within existing duct work. In this connection, there have been several attempts to develop flue damper devices which may be readily and efficiently installed when desired. For example, U.S. patent 4,413,613 in Dunlap sets forth a damper device that is insertable into a slotted duct or flue. The damper is oriented and arranged for ease of installation and essentially requires a preslotted flue for utilization thereof.

U.S. patent 4,235,256 to Crawshay sets forth an elaborate damper assembly for closure of duct work that normally conducts hot course of gases therethrough wherein an elaborate arrangement enables a vertically mounted door to slidably secure a duct work when desired, but is of a relatively remote organization to that of the instant invention involving an association of relatively complex parts for enabling relative movement of a closure door.

U.S. patent 4,207,864 to Fischer sets forth a duct work that is temperature sensitive to distortion to effect a frame and damper door construction that will distort upon thermal growth due to passage of heat therethrough.

U.S. patent 4,476,852 to Lee sets forth a catalytic converter damper assembly positionable between the flue and outlet pipe of a wood-burning stove to provide enhanced efficiency of heat derived from such stove wherein a damper plate and handle is positioned for access by a user thereof.

U.S. patent 4,691,689 to Sheperd sets forth an adjustable damper for tubular duct work of a manually manipulatable variety to enable selective closure of the duct work in controlling airflow therethrough.

As such, it may be appreciated that there is a continuing need for a new and improved fire damper kit that addresses the problems of convenience and ease of installation as well as effectiveness, and in this respect the present invention substantially fulfills this need.

SUMMARY OF THE INVENTION

In view of the foregoing disadvantages inherent in the known types of fire dampers now present in the prior art, the present invention provides an fire damper kit wherein the same may be conveniently and efficiently secured within an existing duct work and sensitive to fire therein for closure of the damper in an efficient manner. As such, the general purpose of the present invention, which will be described subsequently in greater detail, is to provide a new and improved fire damper kit which has all the advantages of the prior art fire dampers and none of the disadvantages.

To attain this, the present invention comprises a fire damper kit for accommodation of rectangular or tubular duct work formed with an access door for resetting of the damper, as required, wherein the damper includes a spring biased door maintained in a first open position by means of a fusable link that is retracted to a closed second position upon destruction of the fusable link by fire within the damper duct work. Further, a first collar is fixedly secured to said damper with a second collar slidable thereon to sandwich a fire wall therebetween and secure said damper thereto.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fire damper kit which has all the advantages of the prior art fire dampers and none of the disadvantages.

It is another object of the present invention to provide a new and improved fire damper kit which may be easily and efficiently manufactured and marketed.

It is a further object of the present invention to provide a new and improved fire damper kit which is of a durable and reliable construction.

An even further object of the present invention is to provide a new and improved fire damper kit which is susceptible of a low cost of manufacture with regard to both materials and labor, and which accordingly is then susceptible of low prices of sale to the consuming public, thereby making such fire damper kit economically available to the buying public.

Still yet another object of the present invention is to provide a new and improved fire damper kit which provides in the apparatuses and methods of the prior art some of the advantages thereof, while simultaneously overcoming some of the disadvantages normally associated therewith.

Still another object of the present invention is to provide a new and improved fire damper kit readily installed with a first fixedly secured flange formed to an exterior surface of said fire damper with a second flange slidable thereon to sandwich a fire wall therebetween.

Yet another object of the present invention is to provide a new and improved fire damper kit formed with a fusable link to enable release of a flue door to prevent flow of fire and air through said damper and prevent spread of a flue fire thereby.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention with a partial section broken away to illustrate the fire damper door therein.

FIG. 2 is a longitudinal orthographic view taken in elevation of the fire damper kit of FIG. 1 secured to an associated fire wall.

FIG. 3 is an isometric illustration of a further example of the instant invention with a partial section broken away to illustrate the fire damper door therein.

FIG. 4 is a longitudinal orthographic view taken in elevation of the invention as illustrated in FIG. 3 secured to an associated fire wall.

FIG. 5 is an isometric illustration of the fusable link secured within curvilinear guides to replaceably secure said fusable link therein.

DESCRIPTION OF THE PREFERRED EMBODIMENT

With reference now to the drawings, and in particular to FIGS. 1 to 5 thereof, a new and improved fire damper kit embodying the principles and concepts of the present invention and generally designated by the reference numerals 10 and 11 will be described.

More specifically, it will be noted that the fire damper kit 10 essentially comprises a damper box 12 of generally rectangular configuration formed with a top wall 13, a bottom wall 14, a left side wall 15, and a right side wall 16. An access door 17 is pivotally mounted within the bottom wall 14 and secured selectively thereto by means of a pivoting latch 18 to enable access to the damper assembly within upon need to reset the damper when occurrence of a burning through of the thermal fusable link 26 has occurred to reopen the door and reset the door to the inner surface of top wall 13, as illustrated in FIG. 1.

A first "L" shaped securement bracket 19 is fixedly secured to the damper box 12 to enable the damper box to be slid through an associated fire wall "F", as illustrated in FIG. 2, with a second "L" shaped securement bracket 20 that may thereafter be slid on the other projecting end of the damper box 12 to efficiently and readily secure the damper box to the associated fire wall "F". Thereafter the associated duct work members 21 may be fitted to the damper box 12 by means of overlapping flanges 22 to secure the fire box to the duct work.

It may be appreciated that flanges 22 may overlie the duct work or telescope therewithin to provide a desired fit and accommodation of various fire codes.

The damper assembly includes a damper door 23 pivotally secured to an interior surface of top wall 13 by means of a hinge 24 fitted to a remote end of the damper door 23. A spring 25 normally biases the damper door 23 to a closed position, as illustrated in phantom in FIG. 2, against an abutment 27. When the damper door 23 is closed in this manner, a chimney fire or flue fire will be halted at the closure of the damper door 23.

A thermal fusable link 26 normally positions the damper door 23 in a first upper position against the interior surface of top wall 13, essentially as illustrated in FIG. 2. Upon a burning through of the fusable link 26, replacement thereof is necessary and accordingly access through the access door 17 is effected whereupon a replacement fusable link is positioned slidably along the first and second "L" shaped groove members 28 and 29 that maintain the fusable link in a desired orientation wherein the damper door 23 is pivoted above the grooves 20 and 29 and thereafter released against the fusable link 26 to maintain the access door 23 in the first position, as illustrated in FIG. 2.

A modification of the damper assembly fitted to a circular damper box 12a is illustrated in FIG. 3. In this manner a centrally pivoted damper door 30 is again biased by means of a spring 25 with a fusable link 26 positioned centrally or diametrically across the expanse of the damper box 12a. An upper and lower abutment 32 and 33 respectively will maintain the damper door 30 in a vertical orientation upon a burning through of the fusable link 26. The modification of FIG. 3 effects a somewhat faster closure of the damper door 30 by limiting the arc of travel necessary to effect closure of the damper box 12a upon the fusable link 26 being burned through by a flue fire.

Similarly, a first fixed "L" shaped securement bracket 19a is fixedly secured to the damper box 12a with a second slidable "L" shaped securement bracket 20 slidable about the fire box projecting on the other side of the fire wall "F" upon positioning of the damper box 12a therethrough. Further, an access door (not shown) in a like manner as set forth in FIG. 1 may be secured to the circular damper box 12a.

As to the manner of usage and operation of the present invention, the same should be apparent from the above description. Accordingly, no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A flue damper kit positioned in alignment with duct work and secured through a fire wall to halt air flow through said duct work upon sensing of fire therethrough, said damper kit comprising, an elongate damper box defining first and second ends of securement to duct work, and a damper assembly including a damper door pivotally mounted within said damper box orthogonally positioned relative to said first and second ends, and fusable link means underlying said damper door to maintain said damper door in a first open position, and spring means to bias a damper door to a second closed position orthogonal to said first position upon destruction of said fusable line, and wherein said fusable link is a thermally sensitive fusable link, and wherein said flue damper kit further includes a first fixed "L" shaped securement bracket secured to an exterior surface of said damper box, and a second slidable "L" shaped securement bracket slidable over said damper box for securing and sandwiching said fire wall between said first and second "L" shaped securement brackets, and wherein a first and second "L" shaped groove is formed integrally onto opposite sides of said damper box for slidingly securing said fusable link means therethrough, and wherein the first and second "L" shaped grooves are positioned adjacent an upper interior surface of said fire box, and wherein said damper door is pivotally mounted at a first end of said damper door adjacent an upper interior surface of said damper door box, and wherein an access door is pivotally mounted to a bottom wall of said damper box overlying an opening to enable access to said damper assembly.

* * * * *